Nov. 10, 1942.  H. L. CORWIN  2,301,371
CENTRIFUGAL SAND SEPARATOR
Filed Nov. 3, 1939  2 Sheets—Sheet 2
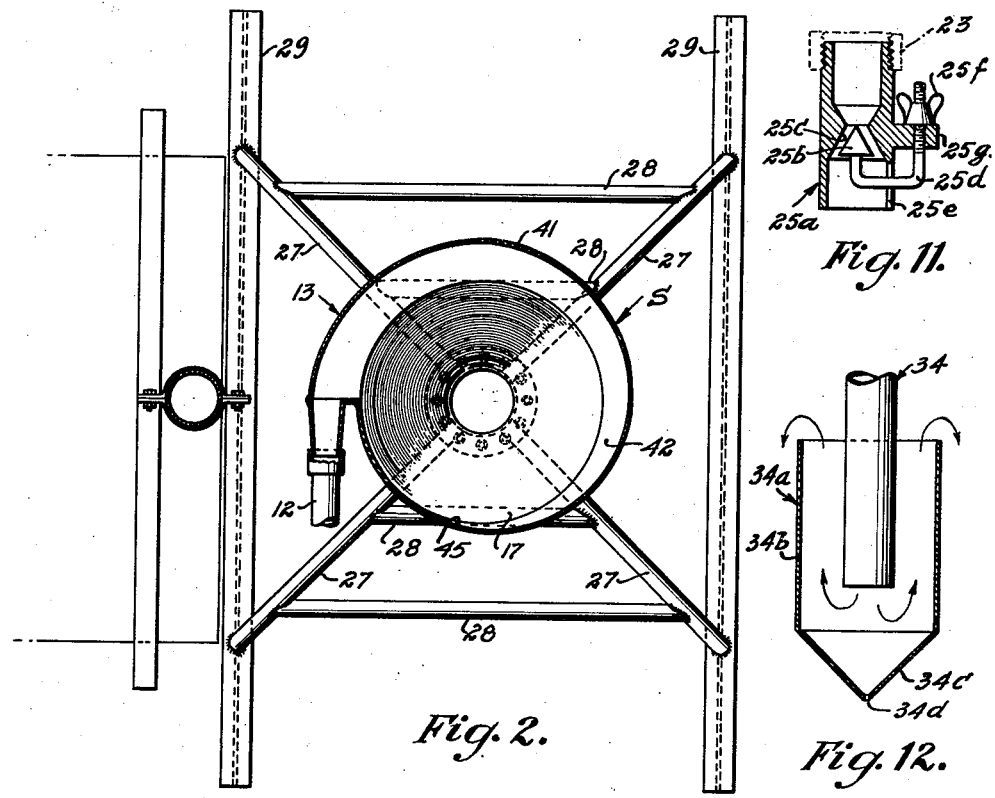
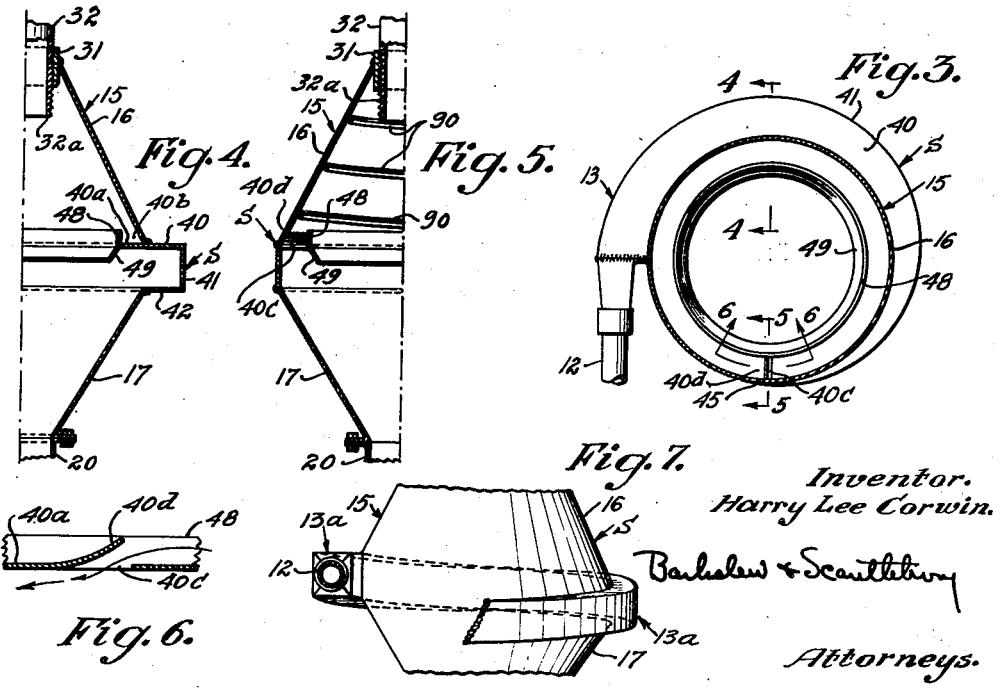
Inventor.
Harry Lee Corwin.
Attorneys.

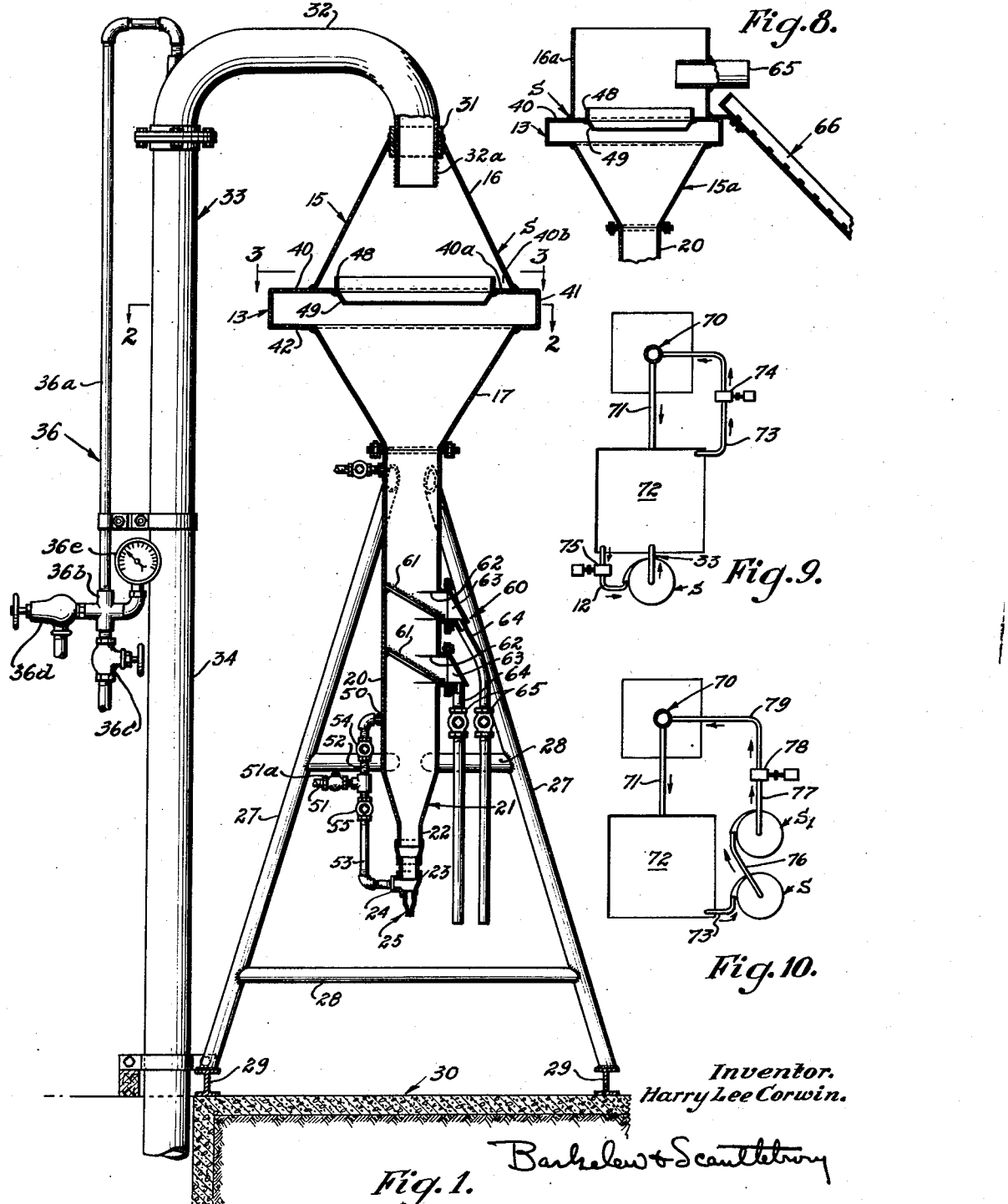

Patented Nov. 10, 1942

2,301,371

UNITED STATES PATENT OFFICE 2,301,371

CENTRIFUGAL SAND SEPARATOR

Harry Lee Corwin, Los Angeles, Calif., assignor to Vernon Tool Co. Ltd., Los Angeles, Calif., a corporation of California Application November 3, 1939, Serial No. 302,684

14 Claims. (Cl. 210—57)

This invention relates generally to sand separators, and more particularly to that class of sand separators in which sand or other relatively heavy material is separated from liquid fluids of any kind, such for instance as water or water and light muds or other constituents, or in which solid particles are separated from any gaseous fluid such for instance as air, by centrifugal forces set up by causing the fluid to swirl about in a circular chamber, the sand or other heavy material being thrown outwardly and then settling within a draw-off conduit, and the fluid and lighter constituents being drawn off at the top. The invention will be herein described in a form particularly designed for the separation of sand from the "rotary mud" and water used in rotary oil well drilling though of course without implied limitation to such use. With particular reference to the separation of sand from rotary mud and water, it is well known that the shaker screens now in use for this purpose are incapable of separating out the finer sand, and in fact, can not be effectively used at finer than forty or fifty mesh. Sand very much finer than this is however present, and not being removed, has a very damaging effect on the circulation equipment. It is accordingly one general purpose of the present invention to provide a separator adapted for separation of sand from rotary mud and capable of taking out much finer sand than can be separated by screening.

A further general object of the invention is the provision of an improved centrifugal sand separator characterized by substantially increased speed and effectiveness of action.

A further object of the invention is the provision of a centrifugal sand separator having a novel tangential inlet arrangement and a novel baffle arrangement designed to facilitate and improve the separating action of the apparatus.

A further object of the invention is the provision of a centrifugal sand separator having novel means for facilitating the discharge of sand from the apparatus and novel and improved means for assuring a more complete separation of sand from the water and light constituents such as muds.

A further object of the invention is the provision of a simplified circulation system incorporating a centrifugal type separator.

A still further object of the invention is the provision of a sand separator having means for separating and classifying gravel particles.

Various additional objects of the invention, as well as the invention itself, will appear and be described in the course of the following detailed description of a present preferred embodiment thereof, reference for this purpose being had to the accompanying drawings, in which:

Fig. 1 is a vertical longitudinal section through a separator in accordance with the invention;

Fig. 2 is a horizontal section taken on line 2—2 of Fig. 1;

Fig. 3 is a horizontal section taken on line 3—3 of Fig. 1;

Fig. 4 is a detail section taken on line 4—4 of Fig. 3;

Fig. 5 is a detail section taken on line 5—5 of Fig. 3;

Fig. 6 is a detail section taken on line 6—6 of Fig. 3;

Fig. 7 is a fragmentary elevation showing the centrifugal chamber equipped with a modified tangential inlet;

Fig. 8 is a section showing a modification in which an open top type of chamber is used and in which the chamber discharges the separated water and mud directly onto a riffle board;

Fig. 9 shows a typical circulation system for separating sand from the rotary mud being used in well drilling operations;

Fig. 10 shows a modified circulation system in accordance with the invention;

Fig. 11 shows a modified form of sand discharge nozzle; and

Fig. 12 shows a water seal for the lower end of the siphon.

The liquid containing the sand to be separated out is introduced to the separator, designated generally at S, from a supply pipe 12 via a tangential inlet 13, inlet 13 discharging to the interior of a shell or chamber 15, of circular cross section, and made up preferably of a conical top portion 16 and a conical bottom portion 17. Leading downwardly from the lower end of conical bottom portion 17 of shell 15 is a reduced downwardly extending elongated tubular conduit or settlement column 20. The lower end portion of this column 20 has a gradual reduction, as indicated at 21, and its lower reduced end 22 is coupled to a fitting 23 having a lateral water inlet connection 24 and a downwardly discharging nozzle 25. Discharge nozzle 25 is screw-threaded into the bottom of fitting 23, and is interchangeable with other nozzles having different sized orifices, the orifice in any given case being chosen for the particular coarseness and amount of sand which the separator is to handle. Alternately, an adjustable nozzle, such as typically shown in Fig. 11, may be employed and is of advantage in many instances. This nozzle, designated generally by numeral 25a, is provided with an adjustable cone 25b positioned within a conical orifice 25c, and is mounted on a shank 25d passing through a slot 25e in the nozzle and supported by a nut 25f threaded on its end and engaging a nozzle lug 25g.

The apparatus is shown provided with supporting legs 27 welded at their upper ends to the upper end portion of tubular member 20 and braced to member 20, at a point lower down, by brace member 28. Legs 27 are shown as resting on I-beams 29 supported by any suitable foundation 30.

Connected to an outlet 31 at the upper end of the conical upper portion 16 of shell 15 is a suction pipe 32 forming a part of a siphon generally designated by numeral 33, the latter including a downwardly extending discharge pipe 34 which discharges at an elevation preferably somewhat below the lower end of column 20. It may here be stated that any appropriate suction means other than a siphon may of course be employed for removing the liquid from the top of shell 15, though a siphon is simple and preferred. To regulate the suction of the siphon, the elevation of its lower end may of course be adjusted; however, it is somewhat simpler to provide the siphon with an adjustable air inlet means such as indicated at 36, to adjustably relieve the suction applied to the upper end of shell 15. In the physical form as here typically indicated, this air inlet means comprises a pipe 36a connected to the top of the siphon and extending downwardly therefrom to a convenient level, having on its lower end a cross 36b, to the lower arm of which is connected a needle valve 36c, to one lateral arm of which is connected a vacuum relief valve 36d, and to the other lateral arm of which is connected a vacuum gage 36e. The needle valve 36c admits air to line 36a to adjust the vacuum normally obtaining therein, while the vacuum relief valve 36d automatically opens when the desired degree of vacuum is exceeded. These described provisions enable nice regulation of the degree of suction exerted by the siphon.

Preferably, the lower end of siphon discharge pipe 34 is furnished with a water seal 34a (see Fig. 12), here shown in the form of a vessel 34b having a conical bottom 34c pierced with a sand discharge aperture 34d, said vessel receiving the lower end portion of siphon pipe 36, as illustrated. The water discharged from the lower end of the siphon pipe travels upwardly therearound within vessel 34b, to spill over the edges of the latter, while any sand settling within the vessel escapes by way of aperture 34d. Thus a water seal is provided at the lower end of the siphon, effectively guarding against admission of air and consequent loss of suction.

In the present illustrative and preferred form of the invention, the tangential inlet 13 is in the form of a volute, extending approximately three-fourths of the way around shell 15. This volute is defined by a horizontal upper wall 40, welded to the lower edge of conical member 16 and extending inwardly within shell 15 to provide an annular flange 40a forming a baffle, an outer wall 41, and a lower horizontal wall 42, the latter welded to the upper edge of lower conical member 17. As will be evident from an inspection of Fig. 2, the volute pinches out at a point 45 located approximately three-fourths of the way around the shell from its inlet end, the horizontal wall 42 coming to an end at said point 45, and the outer wall 41 coming into vertical alinement and joining directly with the circular lower and upper edges of conical members 16 and 17, respectively, between said point 45 and the beginning point of the volute.

The inner edge of flange 40a is preferably provided with an upwardly turned annular flange 48, and also with a downwardly and inwardly extending flange 49, the purpose of which will be explained below.

It has been mentioned before that there is a water inlet connection 24 between the lower reduced end portion of column 20 and nozzle 25. The column 20 is provided with another water inlet connection at 50, the latter being located preferably in the lower portion of member 20, but somewhat above the reduction 21. However, while the apparatus has been found to operate to advantage with the two water inlets located as illustrated, the precise location of these inlets is of course subject to some variation within the scope of the invention, any location which will serve the purpose and function in the manner intended coming within the purview of the invention.

As here illustrated, water inlet connections 24 and 50 are served by common water supply pipe 51, the latter serving two branches 52 and 53 going to connections 50 and 24, respectively. The branches 52 and 53 have control valves 54 and 55, respectively. Pipe 51 preferably has a check valve 51a to guard against contamination of the supply lines. Any usual means may be used for the purpose of determining the water level within column 20.

A feature of the invention is a gravel separator means 60 located within the pipe member 20, which guards against gravel particles travelling down to and choking nozzle 25, and which may also be employed, in certain situations, as a gravel classifier as well as separator. Thus, as shown in Fig. 1, the column 20 may be furnished with one or a plurality of coarse screen 61, arranged in an angular position, and if more than one are used, of increasing fineness of mesh in a downward direction. The coarser material which does not pass through these screens is discharged outwardly through openings 62 leading to spouts 63 having connected thereto discharge pipes 64, the latter controlled by shut-off valves 65. It will be understood that the coarser material will be removed by the upper screen, certain coarse material which passes the upper screen will be removed by the second screen, and so on throughout however many screen members may be employed. The shut-off valves 65 are normally closed, so as to avoid continuous discharge of water by way of pipes 64, and are only opened intermittently to discharge the accumulation of gravel or whatever other material has been removed. It will be evident that the material discharged from the several pipes 64 will be classified as for size, which is a feature of advantage for certain purposes and uses to which the invention may be adapted. Of course, in any case in which classification is of no advantage, the screens may if desired all be of the same mesh, or perhaps but a single screen may be employed.

The operation of the separator is as follows: Assuming the separator is to be employed for separating sand from rotary mud employed in rotary well drilling operations, the mud is introduced to shell 15 via inlet pipe 12 and tangential inlet volute 13, the material being introduced with considerable velocity so that a swirling motion of the liquid within shell 15 is established. Usually the material will be introduced to the shell 15 under the pressure of a force pump connected to line 12, though in some cases the apparatus may be operated by means of the suction applied to the outlet pipe 32, the force pump ahead of the apparatus in such case being omitted. The material so discharged from pipe 12 into volute 13 travels around the latter with considerable velocity, the volute gradually bringing the circularly travelling incoming fluid within the confines of the circular shell 15, and so establishing and keeping up a rotary movement of the entire body of fluid within the shell. The formation of the flanges or baffles 40a and 49 is such as to direct the introduced material in a downward direction. The heavier material, in the present case sand and/or gravel, is thrown outwardly by centrifugal force, tending to move toward or against the outer wall 41 of the volute, as well as to settle, by reason of its weight, downwardly toward the horizontal wall 42 and off the edge thereof as said wall pinches out. The bulk of the sand thus moves downwardly within the lower conical member 17, swirling around more or less in or close to contact with the latter, whereas the lighter fluid, that is, the water and fine mud, travels toward the center of the vessel. This last mentioned material moves upwardly inside baffles 48 and 49 toward the suction outlet at the upper end of conical member 16, being discharged by way of siphon 33. The sand, gravel, or other heavy material, on the other hand, moves downwardly within lower conical member 17 to the column 20, through which it then travels in a downward direction. In the course of this downward travel through conduit 20, the coarser material may be removed by the separator means 60, in the manner previously explained. The sand travels on downwardly to be discharged by way of nozzle 25.

Water, or any other suitable fluid, may be continuously introduced to column 20 via both water connections 24 and 50. The water introduced at 50 gives the sand a light fluid in which it settles rapidly and in which it packs to some extent, thus preventing the escape of mud in a downward direction. Water introduced at that point also tends to keep screens 61 clear. The water introduced at 24, that is, just above the nozzle, sets up a back pressure within the conduit 20, thereby washing the sand clear of mud and keeping the mud from descending to any substantial extent within said conduit. This water introduction at 24 also serves to keep the nozzle clean. The water bath established and maintained by the continuous introduction of water to the lower end of the column 20 is a feature of major importance, as it reduces to a minimum the percentage of mud discharged with the sand. It is found, for operation on most sand carrying muds, that it is sufficient to introduce water at the lower water inlet 24 only; water then being introduced at the upper inlet 50 only when it is desired to add some water to the column or to clear the screens.

As previously stated, the water and mud travels inwardly toward the center of the vessel 15 as the sand moves outwardly by centrifugal force, and thence rises inside baffles 49 and 48 toward discharge outlet 31, keeping up its circular swirling motion all the while. Whatever small proportion of sand rises into the upper portion 16 of shell 15 is thrown outwardly by centrifugal force and settles outwardly along the sloping walls of cone 16. The downwardly projecting end 32a on discharge siphon 32 prevents any of this sand from going out by way of the siphon, and the sand thus descends along wall 16 and within the channel 40b formed by baffle 48 and the upper side of flange 40a, the sand still travelling in a circular motion within said channel 40b. This sand passes downwardly through a slot 40c in flange 40a (see Figs. 3, 5 and 6), being caught by a lip 40d bent upwardly from flange 40a and which is adapted to intercept the sand flowing around channel 40b and to deflect it downwardly through slot 40c to the space immediately below. This sand slot 40c is preferably located between the point 45 at which the inlet volute 13 pinches out and the inlet end of the volute, so that the sand passing through aperture 40c does not interfere to any particular extent with the incoming fluid flow; as here shown, the aperture 40c is located just at point 45.

The sand which passes through the slot in flange 40a is fed substantially directly into the incoming spiral flow of fresh fluid and is thus immediately recirculated for separation below flanges 40a and 49 in the lower cone 17.

The suction applied by the siphon 33 is adjusted to be such, with relation to the inlet velocity of the incoming fluid, the size of the sand discharge nozzle 25, and the rate of water inflow at points 24 and 50, as to maintain a condition of static pressure balance within shell 15 and column 20. That is to say, the suction applied by siphon 33 is sufficient that the fluid and mud within shell 15 does not tend to flow downwardly through column 20 to discharge at nozzle 25, but instead is taken off by way of the siphon at the same rate at which it is introduced to the shell. If the suction of the system is too weak, the fluid falls within column 20 and discharges rapidly along with the sand at discharge nozzle 25. If the suction is too great, the separating function of the apparatus is interfered with and sand passes off via the siphon along with the fluid. The vacuum adjustment needle valve 36c and the vacuum relief valve 36d are therefore adjusted to establish a condition of what may be described as static balance, the mass of fluid and mud within the vessel being held up by the suction and being caused to flow outwardly by way of the siphon due to the pressure of the incoming fluid and mud, and the sand settling out by gravity and being discharged at nozzle 25. Under the conditions as described the separation of sand from mud and water is very complete, the sand discharged from the sand nozzle including a substantial proportion of particles as fine or finer than 200 mesh, while the percentage of mud lost at the sand nozzle is very slight.

It was previously mentioned that the baffle 49 in the form of the invention shown in Figs. 1 through 6 is designed to direct the incoming material in a downward direction, so as to give to the sand particles an initial downward component of velocity, such as will aid in settling of the sand toward sand outlet member 20. Fig. 7 shows a modified arrangement designed for accomplishment of the same purpose, the tangential inlet volute, indicated in this instance by numeral 13a, being formed in a downward spiral, so that the material is introduced to the vessel in a tangential but downward direction. This construction is of advantage in that it is somewhat more strongly conducive to throwing of the sand toward the bottom of the vessel.

Fig. 5 indicates a spirally arranged flange 90 mounted on the inner wall of upper chamber section 16, extending around the interior of the latter and functioning as a lead screw element to carry the circularly travelling sand in a downward direction. This spiral element 90 is of advantage in working the sand in a downward direction at a faster rate than it would settle by gravity alone, though while the use of this element is preferred, the apparatus operates satisfactorily in most instances without it.

Fig. 8 shows a modification, in which the upper portion 16a of the vessel, here designated generally by numeral 15a, is open-topped, and is provided with a lateral discharge outlet 65. Aside from the modified top structure, the treater may be the same as in Fig. 1, including the same or similar water introduction means, sand discharge nozzle, etc. The open top arrangement of Fig. 8 is advantageous where it is desired to de-gas the mud, it being understood that the rotary mud as it comes from the oil well has frequently entrained within it a large proportion of gas from the well, and that it is desirable that this gas be released in some manner before the mud is re-used. The open top of Fig. 8 induces such gas to be released from the fluid which is swirling about within the vessel. As is well known, it is a common procedure to de-gas the mud by pumping it to a point of discharge over a riffle board, the mud giving up its gas as it then flows downwardly along the riffle board. Fig. 8 shows a riffle board 66 positioned to receive the separated mud discharged directly from the sand separator by way of outlet 65. Thus the single pump that serves the sand separator also serves the de-gasing riffle board.

Fig. 9 shows one type of circulation system incorporating the separator of the present invention. The well is indicated at 70, and the mud line leading from the well at 71, line 71 discharging to a sump 72. One or more screens for separating out coarse matter may be placed in line 71 between the well and the sump, as is well known, though no such screens are illustrated in Fig. 9. Numeral 73 indicates the mud supply line, a pump 74 in line 73 pumping mud from sump 72 back to well 70. The centrifugal separator, indicated at S, receives mud laden fluid, together with sand carried thereby, from sump 72 by way of line 12, a pump 75 in line 12 serving to draw the fluid from the sump and to introduce it to separator S with the necessary initial velocity to set up the described swirling motion therewithin. The discharge siphon 33 of the separator discharges back to sump 72, as indicated. Thus the separator S, arranged as in Fig. 9 continuously recirculates the fluid within the sump, continuously removing sand therefrom, and thus keeping down its percentage of sand content to any desired point.

Fig. 10 shows a modified circulating system, in which but a single force pump is employed, and in which fluid is passed through the separator by virtue of suction applied to its outlet rather than by means of a force pump located ahead of its tangential inlet. In Fig. 10 the well is again indicated at 70, the mud line from well to sump at 71, and the sump at 72. In the particular arrangement illustrated, two separators, S and $S_1$, are shown arranged in series, the first receiving the mud laden fluid from sump 72 by way of line 73, and the second receiving mud from the first separator through a line 76 connecting the outlet of the first with the tangential inlet of the second. The outlet line 77 leading from the top of separators $S_1$ goes to the intake side of pump 78, and the discharge side of the pump is connected by line 79 back to well 70. The pump 78 establishes sufficient suction to draw the mud fluid through the two separators from the sump 72, the suction being sufficient to establish the necessary swirling action within each of the separators. Thus the fluid circulates directly and continuously from the well via line 71 and the sump to the two separators, and from the separators via pump 78 directly and continuously back to the well. The sump 72 may in this instance be comparatively small, if desired, or, as a matter of fact, be omitted entirely, the line 71 in such case leading directly to the tangential inlet of separator S. It will also be understood that any desired screens for taking out the coarser material may be incorporated in the system, at any desired point ahead of the separators S and $S_1$, or that my separator may be used at $S_1$ and a screen member substituted for the separator S. In the event that two or more separators S, $S_1$, etc., are employed, the first in the series will of course be designed to remove the coarser material, the second, a finer grade of material, and so on.

In any instance in which the source of supply of the fluid is at a sufficient elevation above the point of discharge of the siphon the circulation pump may be omitted, the suction exerted by the siphon being effective to maintain the necessary swirling motion of the liquid introduced via the tangential inlet.

It will be understood that the drawings and description are merely illustrative of rather than restrictive on the invention, and that various changes in design, structure and arrangement may be made without departing from the spirit and scope of the invention or of the appended claims.

I claim:

1. A centrifugal separator embodying a closed circular chamber having its axis vertical, a tangential fluid inlet in the side of the chamber in a medial part of its wall, an internal annular flange located just above the tangential inlet and extending inwardly from the chamber wall, a dependent annular flange extending downwardly from the inner edge of the first mentioned flange and overhanging the tangential inlet to divert incoming fluid downwardly, a fluid outlet at the upper end of the chamber, and an outlet for separated material at the lower end of the chamber.

2. A centrifugal separator embodying a closed circular chamber having its axis vertical, a tangential fluid inlet in the side of the chamber in a medial part of its wall, an internal annular flange located just above the tangential inlet and extending inwardly from the chamber wall, a dependent annular flange extending downwardly from the inner edge of the first mentioned flange and overhanging the tangential inlet to divert incoming fluid downwardly, a fluid outlet at the upper end of the chamber, a restricted outlet for separated material at the lower end of the chamber, and means for introducing a fluid to the chamber at a point just above the restricted outlet to create a back pressure above that outlet.

3. A centrifugal separator embodying a closed circular chamber having its axis vertical, a tangential fluid inlet in the side of the chamber in a medial part of its wall, an internal annular flange located just above the tangential inlet and extending inwardly from the chamber wall, a dependent annular flange extending downwardly from the inner edge of the first mentioned flange and overhanging the tangential inlet to divert incoming fluid downwardly, means forming an annular channel adjacent the chamber wall immediately above the first mentioned flange adapted to catch material thrown outwardly against that wall and moving down along it, means conveying material from the catch channel into the incoming stream of fluid below the first mentioned flange, a fluid outlet at the upper end of the chamber, and an outlet for separated material at the lower end of the chamber.

4. A centrifugal separator embodying a closed circular chamber having its axis vertical, a tangential fluid inlet in the side of the chamber in a medial part of its wall, an internal annular flange located just above the tangential inlet and extending inwardly from the chamber wall, a dependent annular flange extending downwardly from the inner edge of the first mentioned flange and overhanging the tangential inlet to divert incoming fluid downwardly, an upstanding annular ledge at the inner edge of the first mentioned flange, forming with that flange a channel adjacent the chamber wall adapted to catch material which is thrown outwardly against that wall and moves down it, said flange having an opening therethrough adapted to convey material from the catch channel through said flange and into the incoming stream of fluid below that flange, a fluid outlet at the upper end of the chamber, and an outlet for separated material at the lower end of the chamber.

5. A centrifugal separator embodying a closed chamber including an upper conical walled portion and a lower inverted-conical walled portion, a tangential fluid inlet in the wall of the chamber near the junction of the two conical portions, an internal annular flange located just above the tangential inlet and extending inwardly from the upper conical wall, a dependent annular flange extending downwardly from the inner edge of the inwardly extending flange and overhanging the tangential inlet to divert incoming fluid downwardly, an upstanding annular ledge at the inner edge of the inwardly extending flange, forming with that flange a channel adapted to catch material which is thrown outwardly against and which moves down the upper conical wall, means conveying material from the catch channel into the incoming stream of fluid below the inwardly extending flange, a fluid outlet at the upper end of the chamber, and a restricted outlet for separated material at the lower end of the chamber.

6. A centrifugal separator embodying a closed chamber including an upper conical walled portion and a lower inverted-conical walled portion, a tangential fluid inlet in the wall of the chamber near the junction of the two conical portions, an internal annular flange located just above the tangential inlet and extending inwardly from the upper conical wall, a dependent annular flange extending downwardly from the inner edge of the inwardly extending flange and overhanging the tangential inlet to divert incoming fluid downwardly, an upstanding annular ledge at the inner edge of the inwardly extending flange, forming with that flange a channel adapted to catch material which is thrown outwardly against and which moves down the upper conical wall, means conveying material from the catch channel into the incoming stream of fluid below the inwardly extending flange, a fluid outlet at the upper end of the chamber, means applying an adjustable vacuum to the fluid outlet to withdraw fluid through the outlet and to balance the column of fluid in the chamber, a restricted outlet for separated material at the lower end of the chamber, and means for introducing a fluid under pressure to the lower end of the chamber at a point just above the restricted outlet to create a back pressure above that outlet.

7. A centrifugal separator embodying a closed chamber including an upper conical walled portion and a lower inverted-conical walled portion, and a settling column of substantially smaller diameter than the conical portions depending from the lower end of the lower conical portion, a tangential fluid inlet in the wall of the chamber near the junction of the two conical portions, an internal annular flange located just above the tangential inlet and extending inwardly from the upper conical wall, a dependent annular flange extending downwardly from the inner edge of the inwardly extending flange and overhanging the tangential inlet to divert incoming fluid downwardly, an upstanding annular ledge at the inner edge of the inwardly extending flange, forming with that flange a channel adapted to catch material which is thrown outwardly against and which moves down the upper conical wall, means conveying material from the catch channel into the incoming stream of fluid below the inwardly extending flange, a fluid outlet at the upper end of the chamber, means applying an adjustable vacuum to the fluid outlet to withdraw fluid through the outlet and to balance the column of fluid in the chamber, a restricted outlet for separated solid material at the lower end of the depending settling column, a screen extending across the settling column above its lower end and adapted to retain coarser grades of solid material and to pass finer grades of such material, and means for introducing a fluid under pressure to the lower end of the settling column at a point just above the restricted outlet to create a back pressure above that outlet.

8. In a separator, having a vertically elongate separating chamber with an inlet for fluid carrying solid matter which is separable by settlement, said chamber adapted to contain a column of such fluid, said chamber being constricted at its lower end, a restricted outlet for separated solid matter at the lower constricted end of the chamber, a fluid outlet for separated fluid at the upper end of the chamber, means applying an adjustable vacuum to the fluid outlet to withdraw fluid therethrough and to balance the column of fluid in the chamber so that the hydrostatic pressure of the fluid column at the lower restricted outlet is substantially zero, and means for introducing a fluid under pressure to the lower constricted end of the chamber at a point just above the restricted outlet to create a back pressure above that outlet to prevent movement of fluid downwardly through the restricted outlet with the separated solid matter.

9. In a separator having a vertically elongate separating chamber with an inlet for fluid which carries solid matter separable by settlement, said chamber adapted to contain a column of such fluid, a depending settlement column forming a lower constricted part of the chamber and tapered at its lower end, a restricted outlet for separated solid matter at the lower tapered end of the settlement column, a screen extending across the settlement column adapted to retain coarser grades of solid matter and to pass finer grades of such matter into the lower part of the column and to the restricted outlet, a fluid outlet for separated fluid at the upper end of the chamber, means applying an adjustable vacuum to the fluid outlet to withdraw fluid therethrough and to balance the column of fluid in the chamber so that the hydrostatic pressure of the fluid column at the lower restricted outlet is substantially zero, and means for introducing a fluid under pressure to the lower tapered end of the settlement column at a point just above the restricted outlet to create a back pressure above that outlet to prevent movement of fluid downwardly through the restricted outlet with the separated solid matter.

10. The method of separating relatively heavy solid matter from a mixture thereof with a relatively lighter liquid in which the heavy solid matter is capable of settling, said method being carried out in a closed chamber having a lower restricted outlet for the solid material and comprising the following steps; continuously introducing the mixture to the chamber and allowing the solid material to settle down and through the lower restricted outlet, and continuously and simultaneously applying suction to the upper part of the chamber to withdraw liquid and to balance the body of liquid in the chamber so that the hydrostatic pressure at the lower restricted outlet is substantially zero, and introducing at a point just above the outlet a fluid under pressure to create a back pressure above the outlet and prevent downward movement of the mixture liquid along with the downwardly moving solid matter.

11. A centrifugal separator embodying a closed circular member having its axis vertical, a tangential fluid inlet in the side of the chamber in a medial part of its wall, an internal flange means located just above the tangential inlet and extending inwardly and downwardly from the chamber wall and overhanging the tangential inlet to divert the incoming fluid downwardly, said flange means defining a central opening through which fluid may pass upwardly in the central part of the chamber, a fluid outlet at the upper part of the chamber, an outlet for separated material at the lower end of the chamber, and means independent of the central opening defined by the flange means and adapted to convey material from above the flange means into the incoming stream of fluid.

12. A centrifugal separator for separating solid matter by settlement from a liquid, embodying a closed circular chamber having its axis vertical, a tangential fluid inlet in the side of the chamber in a medial part of its wall whereby the incoming fluid is thrown into circular flow, annular means inwardly overhanging the inlet to divert the circular flow of fluid downwardly, a liquid outlet at the upper part of the chamber, the lower end of the chamber being constricted and having a restricted outlet for solid matter, means for applying suction to the upper liquid outlet to withdraw liquid therethrough and to balance the column of fluid in the chamber so that the hydrostatic pressure of the fluid column at the lower restricted outlet is substantially zero, and means for introducing a fluid under pressure to the lower constricted end of the chamber at a point just above the restricted outlet to create a back pressure above that outlet.

13. A centrifugal separator for separating solid matter by settlement from a liquid, embodying a closed circular chamber having its axis vertical, a tangential fluid inlet in the side of the chamber in a medial part of its wall whereby the incoming fluid is thrown into circular flow, annular means inwardly overhanging the inlet to divert the circular flow downwardly, the lower part of the chamber being constricted, a long vertical settling column leading down from the lower end of the chamber, the lower end of the column being constricted, a restricted outlet for separated solid matter at the lower constricted end of the column, a liquid outlet at the upper end of the chamber, means for applying suction to the upper liquid outlet to withdraw liquid therethrough and to balance the body of fluid in the chamber and settling column so that the hydrostatic pressure of the fluid at the lower restricted outlet is substantially zero, and means for introducing a fluid under pressure to the lower constricted end of the settling column at a point just above the restricted outlet to create a back pressure above that outlet.

14. A centrifugal separator for separating solid matter by settlement from a liquid, embodying a closed circular chamber having its axis vertical, a tangential fluid inlet in the side of the chamber in a medial part of its wall, the lower part of the chamber being constricted, a long vertical settling column leading down from the lower end of the chamber, the lower end of the column being constricted, a restricted outlet for separated solid matter at the lower constricted end of the column, a liquid outlet at the upper end of the chamber, means for applying suction to the upper liquid outlet to withdraw liquid therethrough and to balance the body of fluid in the chamber and settling column so that the hydrostatic pressure of the fluid at the lower restricted outlet is substantially zero, and means for introducing a fluid under pressure to the lower constricted end of the settling column at a point just above the restricted outlet to create a back pressure above that outlet.

HARRY LEE CORWIN.

CERTIFICATE OF CORRECTION.

Patent No. 2,301,371.  November 10, 1942.

HARRY LEE CORWIN.

It is hereby certified that error appears in the printed specification of the above numbered patent requiring correction as follows: Page 6, first column, line 38, claim 11, for the word "member" read --chamber--; and that the said Letters Patent should be read with this correction therein that the same may conform to the record of the case in the Patent Office.

Signed and sealed this 29th day of December, A. D. 1942.

(Seal)

Henry Van Arsaale,
Acting Commissioner of Patents.